(12) United States Patent
Camp, Jr.

(10) Patent No.: US 7,653,350 B2
(45) Date of Patent: Jan. 26, 2010

(54) WIRELESS TERMINALS AND METHODS FOR COMMUNICATING OVER CELLULAR AND ENHANCED MODE BLUETOOTH COMMUNICATION LINKS

(75) Inventor: William O. Camp, Jr., Chapel Hill, NC (US)

(73) Assignee: Sony Ericsson Mobile Communications AB (SE)

( * ) Notice: Subject to any disclaimer, the term of this patent is extended or adjusted under 35 U.S.C. 154(b) by 1282 days.

(21) Appl. No.: 10/626,224

(22) Filed: Jul. 24, 2003

(65) Prior Publication Data

US 2005/0020209 A1    Jan. 27, 2005

(51) Int. Cl.
*H04B 7/00* (2006.01)

(52) U.S. Cl. .................. 455/41.2; 455/41.3

(58) Field of Classification Search ............. 455/41.2, 455/41.3, 67.11, 67.13, 569.1, 569.2, 63.1, 455/560

See application file for complete search history.

(56) References Cited

U.S. PATENT DOCUMENTS

| | | | |
|---|---|---|---|
| 6,166,667 A * | 12/2000 | Park .................. | 341/94 |
| 6,879,600 B1 * | 4/2005 | Jones et al. .......... | 370/466 |
| 7,023,880 B2 * | 4/2006 | El-Maleh et al. ..... | 370/466 |
| 7,181,252 B2 * | 2/2007 | Komsi ............... | 455/567 |
| 2002/0065045 A1 | 5/2002 | Kim | |
| 2002/0191595 A1 | 12/2002 | Mar et al. | |
| 2003/0002473 A1 | 1/2003 | Goodings et al. | |
| 2003/0045235 A1 | 3/2003 | Mooney et al. | |
| 2003/0095518 A1 | 5/2003 | Suwa | |

FOREIGN PATENT DOCUMENTS

| | | |
|---|---|---|
| JP | 2000-83275 A | 3/2000 |
| JP | 2001-103564 A | 4/2001 |
| JP | 2001-359145 A | 12/2001 |
| WO | WO 00/74350 | 12/2000 |
| WO | WO 02/07379 | 1/2002 |

OTHER PUBLICATIONS

*Specification of the Bluetooth System*, Bluetooth Specification Version 1.1; Part K:3, Feb. 22, 2001, pp. 1-3; 99-138; 426.
English Translation of Office Action, Chinese Patent Application No. 200480020980.6, Aug. 8, 2008.
Office Action, Japanese Patent Application No. 2006-520915, Jun. 1, 2009.

* cited by examiner

*Primary Examiner*—Eugene Yun
(74) *Attorney, Agent, or Firm*—Myers Bigel Sibley & Sajovec, P.A.

(57) ABSTRACT

A wireless terminal includes a Bluetooth module that communicates first information with a remote Bluetooth device, and a processor that selectively encodes the first information based on whether the remote Bluetooth device supports the enhanced communication mode. The wireless terminal can include a cellular transceiver that communicates second information with a cellular network according to a cellular communication protocol. In the enhanced communication mode, the processor may use one or more signal processing operations to encode the first information for transmission to the remote Bluetooth device that are also used to encode the second information for transmission to the cellular network.

14 Claims, 3 Drawing Sheets

WIRELESS TERMINALS AND METHODS FOR COMMUNICATING OVER CELLULAR AND ENHANCED MODE BLUETOOTH COMMUNICATION LINKS

FIELD OF THE INVENTION

This invention relates to wireless communication terminals, and more particularly to wireless terminals that can communicate over cellular and Bluetooth communication links, and methods thereof.

BACKGROUND OF THE INVENTION

The Bluetooth specification provides a Cordless Telephony Profile (CTP) by which cellular terminals may access fixed network telephony services over a short-range Bluetooth communication link with a base station. The CTP protocol is defined by, for example, the *Specification of the Bluetooth System, Cordless Telephony Profile*, Volume 2, Part K:3, Version 1.1, Feb. 22, 2001. The CTP protocol enables a cellular terminal to make calls via a base station, to make direct intercom calls with another cellular terminal, and to access supplementary services that are provided by an external network that is connected to the base station.

Because Bluetooth communication links are intended to operate over relatively short-ranges, high power transmitters (e.g., over +15 dBm) and high sensitivity receivers (−90 dBm) may be needed in the cellular terminal and the base station to obtain adequate spatial coverage in a home or office.

SUMMARY OF THE INVENTION

Some embodiments of the present invention provide a wireless terminal that communicates with a remote Bluetooth device using an enhanced communication mode. The enhanced communication mode may increase the signal to noise margin for the Bluetooth communication link and/or may improve the quality of an audio signal that is communicated over the Bluetooth communication link. The wireless terminal includes a Bluetooth module that communicates first information with a remote Bluetooth device, and a processor that selectively encodes the first information based on whether the remote Bluetooth device supports the enhanced communication mode. The wireless terminal can include a cellular transceiver that communicates second information with a cellular network according to a cellular communication protocol. In the enhanced communication mode, the processor may use one or more of the same signal processing operations to encode the first information for transmission to the remote Bluetooth device, which are also used to encode the second information for transmission to the cellular network.

DETAILED DESCRIPTION

Figure 1:
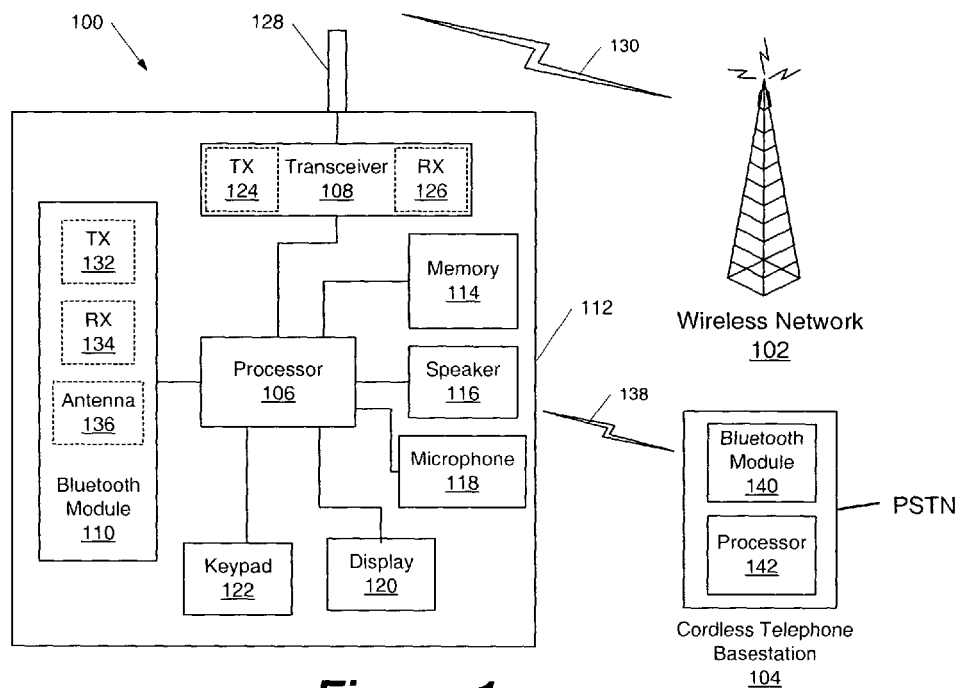
FIG. 1 illustrates wireless communication systems and components according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and wireless terminals according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The invention is generally described herein in the context of wireless terminals that can communicate over a cellular communication channel with a cellular network, and that can communicate over a short-range (i.e., low power) communication channel, such as a Bluetooth communication channel, with network accessible devices or other wireless devices.

As used herein, a "wireless terminal" includes, but is not limited to, a terminal that is configured to communicate via a wireless interface such as, for example, a cellular interface, a wireless local area network interface (WLAN), Bluetooth interface, another RF communication interface, and/or an optical interface. Example wireless terminals include, but are not limited to, a cellular wireless terminal; a personal communication terminal that may combine a cellular wireless terminal with data processing, facsimile and data communications capabilities; a personal data assistance (PDA) that can include a wireless transceiver, pager, Internet/intranet access, local area network interface, wide area network interface, Web browser, organizer, and/or calendar; and a mobile or fixed computer or other device that includes a wireless transceiver. The wireless terminal may be configured to communicate via a cellular communication link that may include a protocol such as, for example, ANSI-136, Global Standard for Mobile (GSM) communication, General Packet Radio Service (GPRS), enhanced data rates for GSM evolution (EDGE), code division multiple access (CDMA), wideband- CDMA, CDMA2000, and UMTS. As understood by those who are skilled in the art, the Bluetooth protocol provides a universal radio interface in the 2.45 GHz frequency band between electronic devices that connect and communicate wirelessly via short-range ad hoc networks. Communication protocols as used herein may specify the information communicated, the timing, the frequency, the modulation, and/or the operations for setting-up and/or maintaining a communication connection.

Also, as used herein, "network access device" includes, but is not limited to, any device that is configured to enable a communication connection between a short-range wireless communication link and a network connection. The network access device may be, for example, a cordless telephone base station that is configured to provide a communication connection between a Bluetooth wireless link and a Public Switched Telephone Network (PSTN). Other examples of network access devices according to embodiments of the present invention include, but are not limited to, devices that are provide a communication connection between a wireless link and a local area network and/or wide area network (e.g., ISDN or Internet).

FIG. 1 is a functional block diagram of an exemplary wireless communication system that includes a wireless terminal 100, a wireless network 102, and a cordless telephone base station 104. The wireless terminal 100 communicates with the wireless network according to one or more communication protocols over a wireless communication channel 130, and communicates with the cordless telephone base station 104 according to the Bluetooth protocol over another wireless communication channel 138.

The wireless terminal 100 includes a processor 106, a transceiver 108, a Bluetooth module 110, a memory 114, a speaker 116, a microphone 118, a display 120, and a keypad 122, which may be at least partially within a housing 112.

The memory 114 may include one or more erasable programmable read-only memories (EPROM or Flash EPROM), battery backed random access memory (RAM), magnetic, optical, or other digital storage device, and may be separate from, or at least partially within, the processor 106. The processor 106 may include more than one processing component, such as, for example, a general purpose processor and a digital signal processor, which may be enclosed in a common package or separate and apart from one another. The transceiver 108 typically includes both a transmitter 124 and a receiver 126 to allow two way communications, but the present invention is not limited to such devices and, as used herein, a "transceiver" may include both a receiver and a transmitter or only one such communication circuit. The wireless terminal 100 may, thereby, communicate with the wireless communications network 102 using radio frequency signals. The radio frequency signals may be communicated through an antenna 128 over the communication channel 130 according to one or more cellular communication protocols.

The wireless terminal 100 is also configured to establish the Bluetooth communication link 138 with a remote Bluetooth device, such as the cordless telephone base station 104. The Bluetooth module 110 may include a transmitter 132 and a receiver 134 that are configured to communicate via an antenna 136 through the wireless communication link 138 with a Bluetooth module 140 in the cordless telephone base station 104. The cordless telephone base station 104 is connected to a PSTN and includes a processor 142 that controls the Bluetooth module 140 to provide communication between the wireless terminal 100 and the PSTN.

The wireless terminal 100 may communicate with the cordless telephone base station 104 according to the Bluetooth Cordless Telephony Profile (CTP) and/or a modified protocol that may be based on CTP. The CTP protocol may be defined by the *Specification of the Bluetooth System, Cordless Telephony Profile*, Volume 2, Part K:3, Version 1.1, Feb. 22, 2001.

The processor 106 may support various communication and application related functions of the wireless terminal 100 that may be defined by software in the memory 114. Operating according to the software, the processor 106 encodes (i.e., modifies) the information using signal processing operations for transmission over the cellular communication channel 130. The signal processing operations may include canceling echo in an audio signal from the microphone 118, reducing noise in the audio signal, compensating the audio signal (e.g., amplitude compensation), voice encoding and decoding (e.g., voice compression and decompression), and channel coding and channel decoding the information. The voice encoding and decoding may be performed by, for example, an Enhanced Full Rate (EFR) coder/decoder (codec) or an Adaptive Multi-Rate (AMR) codec. The channel coding may include convolutional coding and interleaving over time. The processor 106 may also use one or more of the signal processing operations to format information for transmission over the Bluetooth communication channel 138, referred to herein as an enhanced communication mode. By using the signal processing operations in the enhanced communication mode, the signal to noise margin for the Bluetooth communication channel 138 may be improved and/or the quality of the audio that may be communicated through the channel 138 may be improved.

The wireless terminal 100 may selectively use the enhanced communication mode for the Bluetooth link based on whether the cordless telephone base station 104 supports the enhanced communication mode. For example, the wireless terminal 100 may establish a Bluetooth communication link using the CTP protocol, and then determine whether the cordless telephone base station 104 supports the enhanced communication mode. If the enhanced mode is supported, audio signals may be modified using one or more of the signal processing operations and transmitted to the cordless telephone base station 104 where they are received and processed using corresponding signal processing operations. Alternatively, if the enhanced mode is not supported, audio signals may be transmitted without using the signal processing operations. Accordingly, the wireless terminal 100 can be compatible with cordless telephone base stations or other network access devices that support conventional and/or enhanced communication modes.

Figure 2:
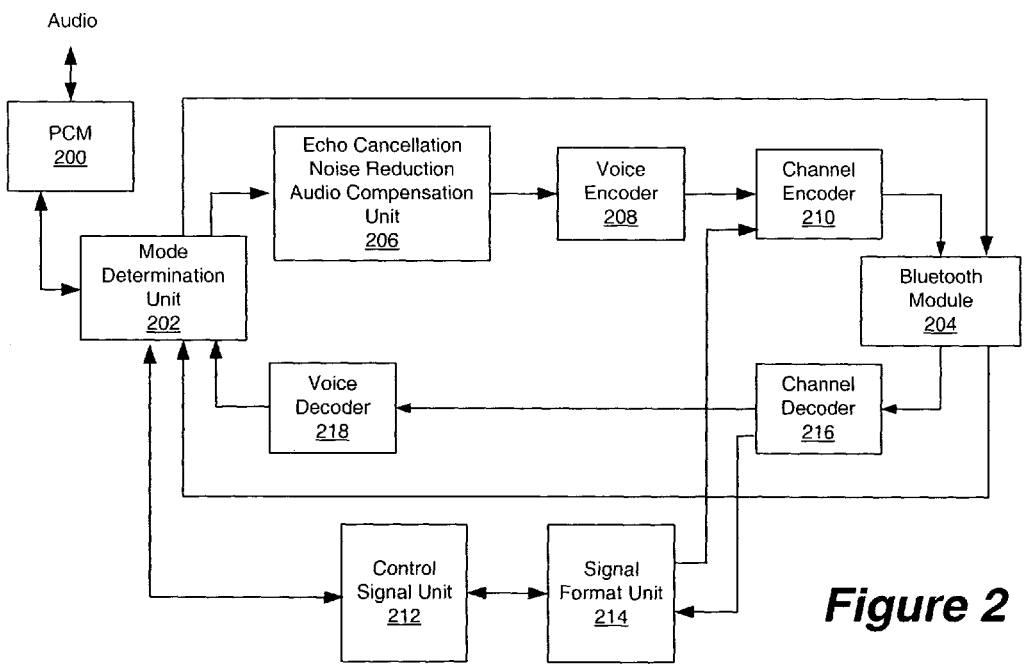
FIG. 2 illustrates a block diagram of signal processing elements of a wireless terminal according to various embodiments of the present invention.

FIG. 2 is a block diagram of signal processing elements that may be used in, for example, the wireless terminal 100 shown in FIG. 1. The signal processing elements may, for example, be provided by software that is executed by the processor 106 and/or by discrete components that may be within the processor 106. A pulse code modulator (PCM) 200 converts an analog audio signal from the microphone 118 to a digital audio signal that is provided to a mode determination unit 202. The PCM 200 may also amplify and filter the analog audio signal prior to and/or after converting it into a digital signal. The mode determination unit 202 routes the digital audio signal for further signal processing and then to a Bluetooth module 204, or directly to the Bluetooth module 204 based on whether the cordless telephone base station 104 supports an enhanced communication mode. When the enhanced communication mode is not supported, the mode determination unit 202 routes the digital audio signal to the Bluetooth module 204 for communication to the cordless telephone base station 104. Otherwise, when the enhanced communication mode is supported, the digital audio signal is routed to encoding unit 206 where echo may be reduced or canceled (for example when used in a headset), noise (e.g., wind noise) may be reduced, and/or other audio compensation, such as, for example, amplitude adjustment may be performed. A voice encoder 208 compresses the digital audio signal using an audio codec such as, for example, an EFR or AFR codec. A channel encoder 210 then encodes the compressed audio signal for transmission across the Bluetooth communication channel 138. The channel encoding may include interleaving the compressed audio signal over blocks of bursts, which can provide improved performance in RF channels that are subject to selective fading that can cause loss of some of the transmitted bursts.

An enhanced signaling path is also provided by a control signal unit 212 and a signal format unit 214. The enhanced signal path may provide more robust in-band signaling that may be used, for example, to setup and terminate the communication channel 138, to dial and terminate a phone call through the cordless telephone base station 104, and/or to communicate information, such as, for example, caller identification, relating to a call. The control signal unit 212 generates and receives control signals that are communicated across the Bluetooth communication channel 138. The signal format unit 214 encodes and/or decodes the control signals using, for example, convolutional coding and/or decoding operations. The signal format unit 214 provides the encoded control signals as control data to the channel encoder 210. The control signals may be encoded with a higher coding gain than that used for the audio signals, so that the control signals may be more reliably communicated than the audio signals. Higher coding gain for the control signals may allow improved control of the Bluetooth Module 110 and/or the cordless telephone base station 104.

Figure 3:
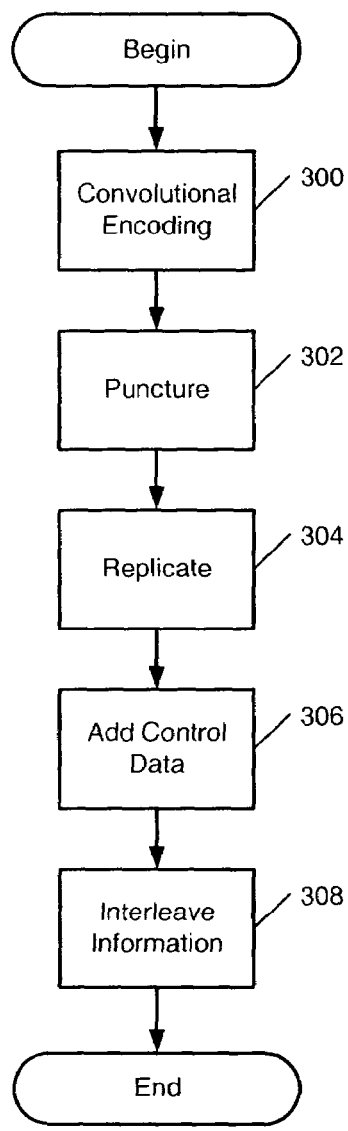
FIG. 3 illustrates operations for channel encoding information for transmission to a cordless telephone base station according to various embodiments of the present invention.

FIG. 3 shows operations that may be performed by, for example, the channel encoder 210 of FIG. 2, to channel encode the audio signal and control signal for transmission to, for example, the cordless telephone base station 104 of FIG. 1. At Block 300, the audio signal is convolutionally coded using, for example, a rate ⅓ or rate ⅕ convolutional coder to form a coded bit stream. At Block 302, the coded bit stream is punctured by removing bits according to a known pattern to provide, for example, a 32 kbps bit stream. The resulting bit stream is replicated at Block 304 by copying the bit stream twice to form a 64 kbps bit stream, which corresponds to the available 64 kbps bandwidth provided by a Bluetooth communication channel. At Block 306, the control signal is added to the bit stream to provide a combined bit stream. At Block 308, the combined bit stream is interleaved over time. For example, when audio coding is performed in 20 mSec periods, the combined bit stream may be interleaved over five synchronous channels of the Bluetooth communication channel 138. Interleaving the combined bit stream over time coupled with the frequency hopping nature of the Bluetooth communication channel 138 can further increase the coding gain and the associated signal to noise margin and robustness of the communication channel 138. Although in some situations complete data bursts may be interfered with and corrupted, the coding gain may still allow the data to be received and properly decoded. Moreover, the increased coding gain and signal to noise margin may allow the use of a lower transmission output power level.

Figure 4:
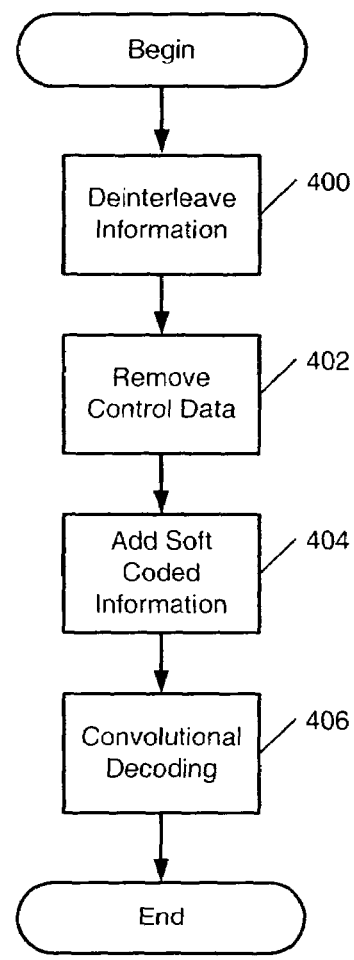
FIG. 4 illustrates operations for channel decoding information received from a cordless telephone base station according to various embodiments of the present invention.

Referring again to FIG. 2, information that is received by the Bluetooth module 204 may be selectively decoded by a channel decoder 216 and a voice decoder 218, when the received information is encoded according to an enhanced communication mode, or otherwise routed directly to the PCM 200 via the mode determination. FIG. 4 shows operations that may be used by, for example, the channel decoder 216 of FIG. 2 to channel decode received information. At Block 400, the received information is de-interleaved. At Block 402, control data is removed from the deinterleaved information, and provided to the signal format unit 214 of FIG. 2. At Block 404, soft coded information is added to the resulting information, which is then convolutionally decoded at Block 406. Instead of, or in addition to, adding soft coded information, the high channel coding ratio may be used to correct corrupted information bits. For example, corrupted bits may be replaced by nulls (or zeros for −1, 1 signaling). The output of the channel decoder 216 is provided to the voice decoder 218, which decodes (e.g., decompresses) voice. The resulting signal is provided to the PCM 200 where it is converted into an analog signal and provided to, for example, the speaker 116 of FIG. 1.

Figure 5:
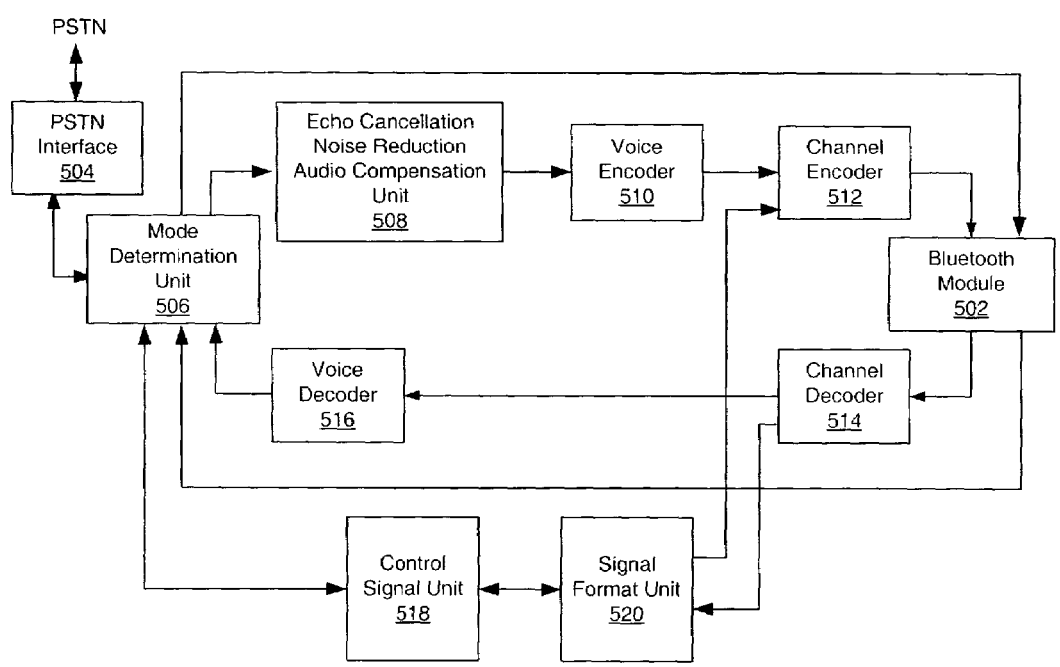
FIG. 5 illustrates a block diagram of a network accessible device according to various embodiments of the present invention.

FIG. 5 shows a block diagram of an exemplary network accessible device, which for purposes of illustration only is configured as a cordless telephone base station, such as the cordless telephone base station 104 of FIG. 1. The cordless telephone base station communicates over a wireless communication channel via a Bluetooth module 502 and with a PSTN via a PSTN interface 504. The cordless telephone base station can provide an enhanced communication mode in which information is encoded and decoded in a similar manner as that described with regard to FIGS. 1-4. For example, signal processing is selectively performed on information that is communicated between the Bluetooth communication channel and the PSTN based on whether an enhanced communication mode is supported. Signal processing may be selectively provided by a mode determination unit 506 that selectively routes information from the PSTN through an encoding unit 508, a voice encoder 510, and a channel encoder 512 to the Bluetooth Module 502. Signal processing may also be selectively provided on a signal and from the Bluetooth module 502 through a channel decoder 514 and voice decoder 516 to the PSTN interface 504. The encoding unit 508, the voice encoder 510, the channel encoder 512, the channel decoder 514, and the voice decoder 516 may operate in the same respective manner as that explained for the encoding unit 206, the voice encoder 208, the channel encoder 210, the channel decoder 216, and the voice decoder 218 of FIG. 2. The cordless telephone base station may also include an enhanced control signal path that includes a control signal unit 518 and a signal format unit 520, which may operate in the same respective manner as that explained with regard to the control signal unit 212 and the signal format unit 214 of FIG. 2. Those explanations are not repeated here for brevity.

Accordingly, a wireless terminal may communicate with a network accessible device over a Bluetooth communication channel using an enhanced communication mode. In the enhanced communication mode, one or more signal processing operations that are used by the wireless terminal to encode information for communication over a cellular communication channel may also be used to encode information for communication over a Bluetooth communication channel. The enhanced communication mode may increase the signal to noise margin for the Bluetooth communication link and/or may improve the quality of an audio signal that is communicated over the Bluetooth communication link.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless terminal, comprising:
a Bluetooth module that is configured to communicate first information with a remote Bluetooth device;
a cellular transceiver that is configured to communicate second information with a cellular network according to a cellular communication protocol; and
a processor that is configured to convolutionally encode the second information for transmission by the cellular transceiver according to a signal processing operation, to convolutionally encode the first information according to the signal processing operation for communication by the Bluetooth module in response to the remote Bluetooth device supporting an enhanced communication mode that allows it to receive convolutionally encoded information, and to communicate the first information through the Bluetooth module without convolutionally encoding according to the signal processing operation in response to the remote Bluetooth device not supporting the enhanced communication mode.

2. The wireless terminal of claim 1, wherein the processor is further configured to encode voice in the second information using at least one of an Enhanced Full Rate (EFR) codec and an Adaptive Multi-Rate (AMR) codec for transmission by the cellular transceiver, and to encode voice in the first information using at least one of the EFR codec and the AMR codec for communication by the Bluetooth module in response to the remote Bluetooth device supporting the enhanced communication mode, and to not encode voice in the first information using either of the EFR codec and the AMR codec for communication by the Bluetooth module in response to the remote Bluetooth device not supporting the enhanced communication mode.

3. The wireless terminal of claim 2, wherein the first information comprises audio information, and wherein the processor is further configured to cancel echo in the audio information for communication by the Bluetooth communication module using a same signal processing operation that is used to cancel echo in audio information in the second information communicated by the cellular transceiver in response to the remote Bluetooth device supporting the enhanced communication mode.

4. The wireless terminal of claim 2, wherein the first information comprises audio information, and wherein the processor is further configured to reduce noise in the audio information for communication by the Bluetooth communication module using a same signal processing operation that is used to cancel noise in audio information in the second information communicated by the cellular transceiver in response to the remote Bluetooth device supporting the enhanced communication mode.

5. The wireless terminal of claim 2 wherein the remote Bluetooth device comprises a cordless telephone base station that is configured to be connected to a public switched telephone network (PSTN), and wherein the processor is configured to communicate through the Bluetooth module with the cordless telephone base station.

6. The wireless terminal of claim 5, wherein the processor is configured to selectively embed control data in the first information based on whether the remote Bluetooth device supports an enhanced communication mode, and wherein the control data comprises a command to control operation of the cordless telephone base station.

7. The wireless terminal of claim 6, wherein the control data instructs the cordless telephone base station to terminate a call on the PSTN.

8. A wireless terminal, comprising:
a Bluetooth module that is configured to communicate first information with a remote Bluetooth device;
a cellular transceiver that is configured to communicate second information with a cellular network according to a cellular communication protocol; and
a processor that is configured to interleave the second information over time for transmission by the cellular transceiver according to a signal processing operation, to interleave the first information over time according to the signal processing operation for communication by the Bluetooth module in response to the remote Bluetooth device supporting an enhanced communication mode that allows it to receive interleaved information, and to communicate the first information through the Bluetooth module without interleaving the first information over time according to the signal processing operation in response to the remote Bluetooth device not supporting the enhanced communication mode.

9. A method of operating a wireless terminal, comprising:
determining whether a remote Bluetooth device supports an enhanced communication mode that allows it to receive convolutionally encoded information;
convolutionally coding first information and communicating the convolutionally coded first information to the remote Bluetooth device in response to the remote Bluetooth device supporting the enhanced communication mode; and
communicating the first information through the Bluetooth module without convolutionally encoding in response to the remote Bluetooth device not supporting the enhanced communication mode.

10. The method of claim 9, further comprising:
encoding voice in the first information using at least one of an Enhanced Full Rate (EFR) codec and an Adaptive Multi-Rate (AMR) codec according to a signal processing operation for communication to the remote Bluetooth device only in response to the remote Bluetooth device supporting the enhanced communication mode.

11. The method of claim 10, further comprising:
encoding voice in second information using at least one of the EFR codec and the AMR codec according to the signal processing operation for transmission to a cellular network.

12. The method of claim 11, wherein the first information comprises audio information, and further comprising canceling echo in the audio information.

13. The method of claim 11, wherein the first information comprises audio information, and further comprising reducing noise in the audio information.

14. A method of operating a wireless terminal, comprising:
determining whether a remote Bluetooth device supports an enhanced communication mode that allows it to receive interleaved information;
interleaving first information over time and communicating the interleaved first information through a Bluetooth module to the remote Bluetooth device in response to the remote Bluetooth device supporting the enhanced communication mode; and
communicating the first information through the Bluetooth module without interleaving it over time in response to the remote Bluetooth device not supporting the enhanced communication mode.

* * * * *

UNITED STATES PATENT AND TRADEMARK OFFICE
CERTIFICATE OF CORRECTION

| | |
|---|---|
| PATENT NO. | : 7,653,350 B2 |
| APPLICATION NO. | : 10/626224 |
| DATED | : January 26, 2010 |
| INVENTOR(S) | : William O. Camp, Jr. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1651 days.

Signed and Sealed this

Twenty-third Day of November, 2010

David J. Kappos
*Director of the United States Patent and Trademark Office*